United States Patent
Souissi et al.

(10) Patent No.: US 6,556,817 B1
(45) Date of Patent: Apr. 29, 2003

(54) METHOD AND APPARATUS FOR SELECTIVELY COMMUNICATING IN A WIRELESS COMMUNICATION SYSTEM BASED ON VARYING TIME INCREMENTAL COSTS OF COMMUNICATION

(75) Inventors: Slim S. Souissi, Ft. Worth, TX (US); John B. Miles, Boiling Springs, PA (US); Henry Wandt, Boynton Beach, FL (US); Donald J. Szczpanik, West Palm Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/459,584

(22) Filed: Dec. 13, 1999

(51) Int. Cl.[7] .............................................. H04M 11/00
(52) U.S. Cl. ...................... 455/406; 455/407; 455/414; 455/458; 455/432; 455/566; 379/114; 379/128
(58) Field of Search .................................. 455/445, 406, 455/407, 432, 550, 566, 414, 458, 466; 340/825.44; 379/114, 128

(56) References Cited

U.S. PATENT DOCUMENTS

| | | | | |
|---|---|---|---|---|
| 4,706,272 A | * | 11/1987 | Nishimura et al. | 379/57 |
| 4,910,510 A | * | 3/1990 | Davis et al. | 340/825.44 |
| 5,303,297 A | * | 4/1994 | Hillis | 379/63 |
| 5,376,931 A | | 12/1994 | Marrs | 340/825.44 |
| 5,579,535 A | * | 11/1996 | Orlen et al. | 455/33.1 |
| 5,594,739 A | * | 1/1997 | Lemieux | 570/350 |
| 5,610,972 A | * | 3/1997 | Emery et al. | 379/58 |
| 5,845,211 A | * | 12/1998 | Roach, Jr. | 455/436 |
| 5,974,308 A | * | 10/1999 | Vedel | 455/407 |
| 5,978,669 A | * | 11/1999 | Sanmugam | 455/410 |
| 5,991,378 A | * | 11/1999 | Apel | 379/114 |
| 6,088,431 A | * | 7/2000 | LaDue et al. | 379/114 |
| 6,101,379 A | * | 8/2000 | Rahman et al. | 455/406 |

* cited by examiner

Primary Examiner—Edward F. Urban
Assistant Examiner—Marceau Milord
(74) Attorney, Agent, or Firm—Randi L. Dulaney

(57) ABSTRACT

A wireless communication system employs a method and apparatus for selectively communicating in the wireless communication system based on varying time incremental costs of communication. A communication unit (116) receives a transmission (118) from the system infrastructure of the wireless system, wherein the transmission indicates a time incremental cost of future communications as temporarily established by the system infrastructure. Responsive to receiving the transmission, the communication unit determines whether the received time incremental cost is acceptable to a user of the communication unit (e.g., whether the received cost is less than or equal to a previously stored desired cost or whether, after displaying the received cost to the user, the user has indicated his or her acceptance of the cost). If the received cost is acceptable, the communication unit transmits a message (119) to the system infrastructure at least indicating the communication unit's desire to communicate in the wireless system.

17 Claims, 6 Drawing Sheets

FIG. 5     500

METHOD AND APPARATUS FOR SELECTIVELY COMMUNICATING IN A WIRELESS COMMUNICATION SYSTEM BASED ON VARYING TIME INCREMENTAL COSTS OF COMMUNICATION

FIELD OF THE INVENTION

The present invention relates generally to wireless communication systems and, in particular, to selectively communicating in a wireless communication system based on varying time incremental costs of communication.

BACKGROUND OF THE INVENTION

Wireless communication systems are known to include a system infrastructure and a plurality of communication devices. Such systems include, but are not limited to, cellular systems, trunked land mobile systems, paging systems, personal communication systems, wireless local loops, wireless data systems, and satellite-based systems. For example, a cellular communication system includes cellular infrastructure (e.g., base sites, base site controllers, mobile switching centers, and home location registers) and radiotelephones. Similarly, a paging communication system includes paging infrastructure (e.g., base sites and central controllers) and one-way or two-way pagers.

To obtain service from a wireless communication system, a user must first request service from the system operator. This request typically involves visiting the system operator or one of its authorized dealers, determining which service plan is most cost-effective based on estimated system usage, and executing a service contract directed to the selected plan. The operator or its dealer also informs the user of the time incremental costs, if any, for using the system in excess of the time allotted in the plan. Such time incremental costs are typically referred to as prime and non-prime rates. The prime and non-prime rates are fixed for certain time periods during the day and days during the week. The non-prime rate is less than the prime rate in an attempt to encourage users to call during non-peak periods (e.g., between 9:00 PM and 6:00 AM Monday-Friday and all day Saturday and Sunday).

However, such simple assignment of prime and non-prime rates does not account for current system traffic on any particular day or at any particular time. For example, if traffic is unusually low during the peak period on Columbus Day (a Monday) at a base site heavily used by government employees because such government employees are off of work, other users are not likely to increase their usage because they must pay the prime rate. Consequently, the system operator's income for that particular day is reduced due to the low peak period traffic. Therefore, although fixed assignment of time incremental costs may be adequate, it is clearly not optimal since system traffic can vary for many reasons.

To anticipate reduced traffic periods and attempt to increase traffic during those periods, system operators advertise reduce rates during the periods (e.g., on holidays). However, these attempts at increasing traffic require advance notice by print mail, by public radio advertising, or by leaving a voice mail in the voice mailbox of system users that receive voice mail service. Therefore, although advanced advertising may help increase traffic on days in which lower traffic can be anticipated, such advertising does nothing for unanticipated periods of reduced traffic.

Although most systems do not provide cost information to users other than in a fixed manner at the user's sign-up of service or at other fixed intervals (e.g., in a print mailing), some systems do provide current costs to the user or the user's communication device. However, these systems use the costs either to simply inform the user how much the ongoing communication is costing the user or to load the current costs in the communication device for charging the user for his or her ongoing communication. For example, U.S. Pat. No. 3,769,463 discloses a device for displaying the current cost of a long distance call to a user of a standard telephone. The device automatically responds to the user's initiation of a call and displays the elapsed time and cost of the call. However, the device does not inform the user, prior to initiation of the call, of the current time, incremental costs associated with using the telephone system as such costs may be varied by the telephone system operator.

As another example, U.S. Pat. No. 5,848,138 discloses a method for transmitting tariff data to a subscriber unit. As described in this patent, the system infrastructure of a wireless' local loop transmits the appropriate tariff data to the chargeable subscriber unit (i.e., pay phone) currently being used by the user to insure that the user is being fairly charged for a call. That is, the chargeable subscriber unit receives tariff data at the beginning of a call made from the pay phone (i.e., after the user has initiated the call) and at appropriate times during the call coinciding with the times at which additional costs are due. For example, after the user lifts the pay phone receiver and dials a telephone number (i.e., initiates a call), the system infrastructure transmits tariff data to the pay phone (e.g., $0.50 for the first three minutes). During the user's use of the phone, the phone receives charge-metering pulses from the system infrastructure to track the current cost of the call. When the number of pulses exceeds the number associated with the transmitted tariff data (i.e., when the call has exceeded the original 50 cent cost), the system infrastructure transmits new tariff data to the pay phone (e.g., $0.30 for the next three minutes). In this way, if the tariff changed during the call, the user is charged the correct amounts. Although this patent may enable system users to be charged more fairly, it does not enable users to regularly determine the time incremental costs of future communications so that the users can determine whether the importance of their calls is worth the potential cost. In addition, the patent does not provide a means for system operators to influence system load over time by varying tariff rates and informing system users of the varying rates.

Therefore, a need exists for a method and apparatus for selectively communicating in a wireless communication system that informs system users in real-time of varying communication rates, thereby enabling users to perform cost-benefit analyses immediately before initiating their communications and enabling system operators to attempt to balance system load during the actual time periods of system imbalance. Such a method and apparatus that also facilitates negotiation of communication costs on a communication unit-by-communication unit basis would be a further improvement over the prior art.

DETAILED DESCRIPTION OF A PREFERRED EMBODIMENT

Figure 1:
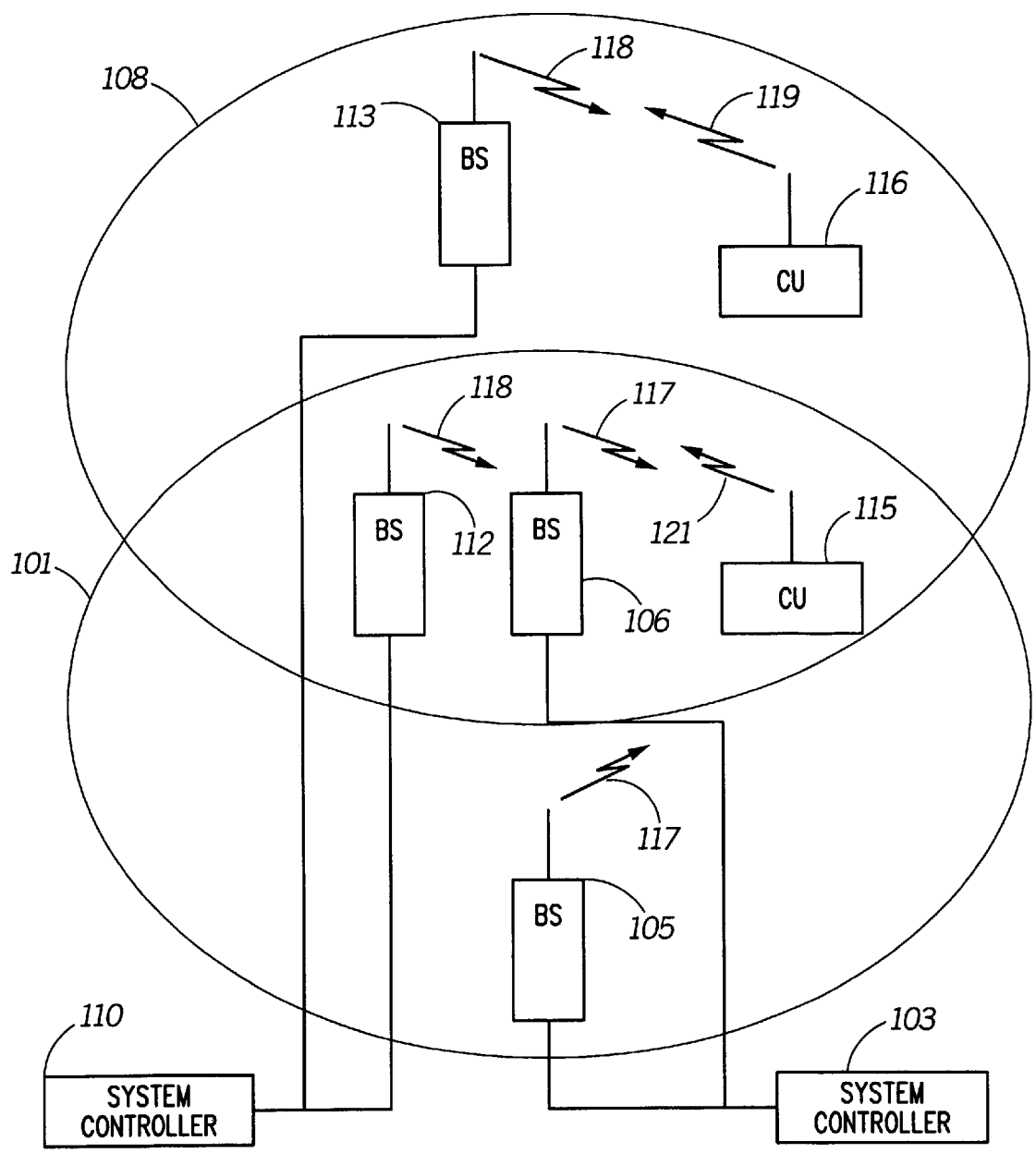
FIG. 1 illustrates a block diagram depiction of a plurality of wireless communication systems in accordance with the present invention.

Generally, the present invention encompasses a method and apparatus for communicating in a wireless communication system that includes a system infrastructure. A communication unit receives a transmission from the system infrastructure that may have been broadcast to multiple communication units or that may have been individually addressed to the communication unit, wherein the transmission indicates a time incremental cost of future communications in the wireless communication system. The time incremental cost is temporarily established by the system infrastructure and sets the cost per unit time of a communication during a particular calling period. The time incremental cost during any particular period may depend upon one or more of a variety of factors, such as system load, time of day, location of the communication unit, level of service for the communication unit, and amount of information to be transmitted to or from the communication unit.

Some time subsequent to receiving a time incremental cost from the system infrastructure, the communication unit transmits a message to the system infrastructure during a time period when the time incremental cost is less than or equal to a desired time incremental cost. The desired time incremental cost may be permanently or periodically stored in the communication unit, or the desired time incremental cost may be dynamically determined by the user of the communication unit. For example, the communication unit may display the time incremental cost received from the system infrastructure to the user (e.g., continuously or for some predetermined time after receipt) and receive user inputs indicating a desire to communicate during a period when the displayed time incremental cost is at a value that is acceptable to the user. The message transmitted by the communication unit may simply indicate a desire to communicate (e.g., in a request/grant system, such as a cellular telephone system) or may additionally include user information (e.g., in a contention system, such as a two-way paging system).

By providing tariff-based communication in this manner, the present invention enables a user of a communication unit to select the appropriate time for his or her communication based on the priority of the communication as weighed against the potential cost of the communication. For example, for low priority calls (e.g., personal calls), the user might wait until the time incremental cost received from the system infrastructure was very low (e.g., $0.02/minute) to place the call; whereas, for high priority calls (e.g., business calls), the user might place the call regardless of cost. The present invention also permits the system operator to influence the system traffic or load by varying the time incremental costs of calls based on time, location, or other factors to increase system traffic during typically low traffic periods (e.g., during the middle of the night) or in typically low traffic areas (e.g., rural areas) and to reduce system traffic during typically very heavy traffic periods (e.g., during the middle of the day) or in typically heavy traffic areas (e.g., downtown metropolitan areas). The present invention provides the aforementioned benefits by providing the temporary time incremental cost to the user prior to the user initiating the calling process, in contrast to prior art methods that provide fixed tariffs to the user after or while the user is in the process of placing his or her call.

The present invention can be more fully understood with reference to FIGS. 1–7. FIG. 1 illustrates a block diagram depiction of a plurality of wireless communication systems (two shown) in accordance with the present invention. Each wireless communication system includes a respective system infrastructure and a plurality of communication units 115–116 (two shown). The system infrastructure of the first wireless communication system includes, inter alia, a system controller 103 and a plurality of base sites 105–106 (two shown). The system infrastructure of the second wireless communication system includes, inter alia, a system controller 110 and a plurality of base sites 112–113 (two shown). The wireless communication systems might comprise two-way radio systems, cellular telephone systems, personal communication systems (PCSs), wireless data systems, paging systems, or any combination thereof. Accordingly, the communication units 115–116 may comprise two-way mobile or portable radios, radiotelephones, two-way pagers, wireless data terminals, or any combination thereof. A preferred communication unit 115 is detailed below with respect to FIG. 2. The remainder of this description will focus primarily on the application of the present invention in radiotelephone and paging systems.

The first wireless communication system provides communication services to communication units 115 located in a first coverage area 101 and the second wireless communication system provides communication services to communication units 115, 116 located in a second coverage area 108. The coverage areas 101, 108 of the systems may overlap (as shown), be completely independent, or be identical. For example, the first wireless communication system may be a cellular system operating in the A-band of cellular frequencies and the second wireless communication system may be a cellular system operating in the B-band of cellular frequencies, wherein both systems provide cellular services to subscribers in the same coverage area.

Each system controller 103, 110 comprises a known controller applicable to its respective system with software modifications necessary to implement the present invention. Therefore, each system controller 103, 110 might comprise a base site controller if its respective system is a cellular communication system, a trunking or dispatch controller if its respective system is a two-way radio system, or a central controller if its respective system is a paging system. The system controllers 103, 110 are coupled to the base sites 105–106, 112–113 of their respective systems via two-way communication links, such as T1 links, T3 links, microwave links, or other comparably-performing communication links.

Each base site 105–106, 112–113 includes the hardware and software components necessary to implement the communication protocols of its respective system. For example, each base site 105–106, 112–113 preferably includes base stations and site message storage and control equipment. The base site elements for the aforementioned types of communication systems are well known; thus, no further discussion of them will be provided except to facilitate an understanding of the present invention.

A communication unit (e.g., communication unit 116) communicates in the wireless communication systems substantially as follows in accordance with a preferred embodiment of the present invention. For the purposes of the first part of this discussion, it is assumed that the communication unit 116 is operating in the second communication system only.

The communication unit 116, after registering with the system in accordance with well-known techniques, receives a transmission 118 from the base site 113 presently serving the communication unit 116 (typically the base site 113 which is nearest the communication unit 116). The transmission 118 includes a digital control message indicating the current time incremental cost for a communication. The transmission 118 may be broadcast to all communication units 116 within the coverage area of a particular base site 113, broadcast to all communication units 115–116 within the system, or transmitted to a particular communication unit 116 in a control message individually addressed to the particular communication unit 116. The time incremental cost (e.g., cost per minute or cost per alpha-numeric character—which, of course, can be broken down into a cost per unit time) is established by the system infrastructure (e.g., the system controller 103) responsive to inputs from the system operator.

The time incremental cost may be dependent on many factors. For example, the time incremental cost may be based on actual traffic or load at a particular base site, anticipated traffic or load at a particular base site based on the base site's location or the time of day, the amount of data or information to transmitted or received by the communication unit 116, the location of the communication unit 116, and/or the level of service of the communication unit 116. For example, the system operator might set a high time incremental cost (e.g., $0.35/minute) for communications by communication units during periods when the load of the system is above a first threshold (e.g., 10,000 subscribers), a lower time incremental cost (e.g., $0.25/minute) for communications by the same communication units during periods when the system load is between the first threshold and a second threshold (e.g., between 5000 and 10,000 subscribers), and a still lower cost (e.g., $0.10/minute) for communications by the same communication units during periods when the system load is below the second threshold (e.g., below 5000 subscribers). The same operator may also set a low time incremental cost (e.g., $0.05/minute) for communications by communication units located in rural areas in an attempt to raise the level of traffic at such locations.

Alternatively, the system operator may set time incremental cost on a communication unit-by-communication unit basis based on the location of the communication unit 116 or the level of service of the communication unit. For example, the communication unit 116 may determine its own location (e.g., if it includes a global positioning satellite receiver) and transmit the location to the infrastructure or assist the infrastructure in determining its location. Alternatively, the system infrastructure may determine the communication unit's coarse location based on the communication unit's last transmission (e.g., the communication unit is located in the coverage area of the base site that received the communication. unit's last transmission or the coverage area of the base site identified (e.g., by color code) by the communication unit in its last transmission) or may determine a more accurate location of the communication unit based on known triangulation methods.

Once the communication unit's location is determined, the system infrastructure can, responsive to system operator input, establish the time incremental cost for future communications of the located communication unit either in the system operator's own system or in another cooperating system (e.g., where two or more system operators have a cooperating relationship to permit roaming of communication units between systems to facilitate lower cost calls) and transmit the time incremental cost to the communication unit. For example, the cooperating system may comprise a blue-tooth network or a high-speed local area network to provide low cost communications in a very localized, high traffic coverage area. In addition, the system infrastructure can establish time incremental costs based on the communication unit's level of service, with high priority service costing more than low priority service. Regardless of what the time incremental cost is ultimately based on, the system infrastructure can vary a particular communication unit's time incremental cost for communications as desired to maximize system performance.

Current systems use a pricing approach in which they designate different time incremental costs for prime and non-prime transmission times. However, these costs are generally fixed for multiple subscribers and, if they change, a mailing must be sent to the subscribers or a message must be left for the subscribers in their voice mail boxes. By contrast, the present invention enables the system operator to set time incremental costs at any time, on a subscriber-by-subscriber basis if so desired, and inform the subscribers immediately of the cost changes. By providing transmissions of the present time incremental costs of communications to communication units, the system operator can attempt to balance the load on his or her system during the actual time period such balancing is desired, as opposed to announcing a price change and having to await its effects.

Once the communication unit 116 has received the time incremental cost transmission 118 from the system infrastructure, the communication unit 116 preferably alerts the user of the communication unit 116 (e.g., through activation of a silent alarm, such as a vibration device, or an audible alarm, such as a series of beeps) that such transmission has been received, and displays the time incremental cost to the user.

Upon obtaining the displayed time incremental cost, the user of the communication unit 116 decides whether or not the displayed time incremental cost is acceptable (e.g., less than or equal to a desired time incremental cost) and, accordingly, instructs the communication unit 116 to either transmit user information (e.g., a data message, such as an electronic mail message or short message, or a voice call, either of which may have been stored in the communication unit's memory prior to receipt of the time incremental cost transmission 118) or do nothing. If the user decides that the displayed cost is acceptable and desires to initiate a communication, the user instructs the communication unit 116 to transmit a message 119 to the system infrastructure (e.g., base site 113) during the time period corresponding to the displayed time incremental cost, wherein the message at least indicates a desire to communicate in the wireless system. That is, the message may be a channel request (e.g., in a cellular system), may include the user's information only and, therefore, inherently indicate a desire to communicate, or may include both a channel request and the user's information. If the message includes only a channel request, then upon the granting of the request by the system infrastructure in accordance with known techniques, the communication unit 116 transmits the user information to the system infrastructure.

In an alternative embodiment, the user may pre-store the desired time incremental cost and.the user information (e.g., data message or other communication) in the communication unit 116. In this case, when the communication unit 116 receives the time incremental cost transmission 118 from the base site 113, the communication unit 116 automatically compares the received time incremental cost with the stored time incremental cost and, if the received time incremental cost is less than or equal to the stored time incremental cost, transmits the user information or a channel request message.

Besides storing the desired time incremental cost in the communication unit 116, the user might also store a maximum transmission delay indication (e.g., a length of time, a time of day, a day of the week, or some other prioritization parameter) to designate how long the communication unit 116 can wait to receive a time incremental cost transmission 118 that indicates a time incremental cost that is less than or equal to the desired time incremental cost. In this case, if the time period associated with the maximum transmission delay indication expires, the communication unit 116 either automatically transmits the stored information regardless of cost (i.e., even if the time incremental cost for the communication is greater than the desired time incremental cost) or informs the user that the transmission has not yet occurred and awaits user input as to whether or not to transmit at the higher-than-desired cost.

For example, if the maximum transmission delay indication is 10:00 PM Tuesday and the desired time incremental cost is $0.001 per alpha-numeric character, then the communication unit 116 either transmits the stored information, or at least a channel request, at 10:00 PM Tuesday even if the actual time incremental cost is $0.003 per alpha-numeric character, or informs the user that as of 10:00 PM no transmission has taken place. However, the communication unit 116 will transmit the user information before 10:00 PM Tuesday if the time incremental cost received from the system infrastructure drops to or below $0.001 per alpha-numeric character.

To inform the user that a transmission occurred due to imposition of the time period associated with the maximum transmission delay indication, the communication unit 116 preferably alerts (e.g., via a vibration or audible tone) the user in the event that the time period associated with the maximum transmission delay indication has expired without prior transmission of the stored communication. In the event that the communication unit has been instructed to inform the user if no transmission has occurred prior to expiration of the time period associated with the maximum transmission delay indication, the communication unit preferably alerts the user and displays a query requesting the user to either authorize or cancel transmission of the stored communication.

If the communication unit 116 is provisioned in another communication system (e.g., the first communication system), the system infrastructure of the system the communication unit 116 is presently operating in (e.g., the second communication system) might also transmit the current roaming costs together with the time incremental cost in the transmission 118 to the communication unit 116. By transmitting the roaming costs together with the time incremental costs, the system provides the user with all the costs associated with making a call or sending data and thereby enables the user to make a real-time, completely informed decision as to whether or not a communication is worth the potential cost.

The communication units 115, 116 receive time incremental cost transmissions 117,118 at various times at the selection of the system infrastructure. For example, the communication units 115, 116 may receive the transmissions 117, 118 periodically (e.g., once every hour), responsive to significant communication-related activity (e.g., when the communication unit 115, 116 initially registers in the system, enters a new base site service coverage area or paging location area, or re-registers in the system after being out of system coverage for a length of time), or subsequent to a change of time incremental cost. The actual times of the transmissions 117, 118 of the time incremental cost information are less important than the fact that, in accordance with the present invention, such time incremental costs can vary (i.e., are temporary) and are being provided to the consumer on a regular basis prior to the consumer's initiation of a call.

In the preferred embodiment described above, the communication unit 116 passively receives time incremental cost transmissions 118 from the base site 113 and a decision is made whether or not to initiate a communication based on the received costs. In an alternative embodiment, the communication unit 116 may take a more proactive role by sending a control message to the system infrastructure requesting transmission of the current time incremental cost for a communication. In this case, the system infrastructure receives the request and, responsive thereto, transmits the current time incremental cost to the communication unit 116.

Alternatively, the communication unit 116 might transmit a request to the system infrastructure for a desired time incremental cost for an upcoming communication. In this case, the request might also include the quantity of information to be transmitted in the upcoming communication or the time duration of the upcoming communication. Upon receiving the request, the system infrastructure (e.g., through a software routine at the system controller 110 or by displaying the information received in the request to the system operator) determines the time incremental cost for the requesting communication unit 116 based on the desired time incremental cost and the quantity of information to be transmitted (or the proposed duration of the call).

For example, if the user of the communication unit 116 desired to convey a large amount of data (e.g., 10 Megabytes) or desired to engage in a lengthy voice call (e.g., 30 minutes), the communication unit 116 might transmit a request to the system infrastructure indicating that the communication unit 116 would like to transfer 10 Megabytes of data for a time incremental cost of $0.30 per Megabyte or would like to engage in a 30 minute call at a time incremental cost of $0.15 per minute. Upon receipt of the request, the system infrastructure then determines whether it can accommodate the request by determining its own time incremental cost based on the received information. Upon determining the time incremental cost, the system infrastructure transmits the cost to the communication unit 116 and the communication unit 116 and/or its user determines whether the received time incremental cost is acceptable. If the received time incremental cost is not acceptable, the offer-counteroffer-acceptance process may repeat until a time incremental cost is established that is acceptable to both parties. Therefore, this embodiment provides a mechanism for the requesting communication unit 116 (or alternatively its user) to negotiate a tariff in real time based on the amount of system resources (e.g., time and/or bandwidth) to be utilized by the requesting communication unit 116.

The description above focused primarily on the operation of a communication unit 116 in a single wireless communication system. However, as also discussed above, many systems may have overlapping coverage areas 101, 108 thereby enabling multiple system providers to compete for subscriber business in those overlapping areas. In such a case, the communication unit (e.g., communication unit 115) operating in a location serviced by multiple communication systems receives time incremental costs from the system infrastructure of each system. For example, as depicted in FIG. 1, the communication unit 115 receives time incremental cost transmissions 117, 118 from a base site 106, 112 of each system.

The communication unit 115 receives the transmissions 117, 118 and either automatically compares the received time incremental costs to a stored desired time incremental cost or displays them to a user of the communication unit 115. In either case, if at least one of the received time incremental costs is acceptable (e.g., less than or equal to a desired time incremental cost), the communication unit 115 transmits the communication 121, or at least a message indicating a desire to communicate, to the base site (e.g., 106) of the system providing the acceptable time incremental cost during the time period when the time incremental cost is acceptable. If more than one received time incremental cost is acceptable, the communication unit 115 selects the system for the transmission (e.g., the system providing the lowest time incremental cost), either automatically or responsive to user input, and transmits the communication 121 or the channel request message to the base site (e.g., 106) of the selected system during the time period associated with the time incremental cost received from that system.

In order to implement this multiple system embodiment of the present invention, the communication unit 115 must be capable of operating in multiple systems. However, presently, many cellular telephones are capable of operating in both the A and B cellular frequency bands, and indeed do so during roaming operation. Accordingly, such communication devices could have their software modified to implement the present invention.

Figure 2:
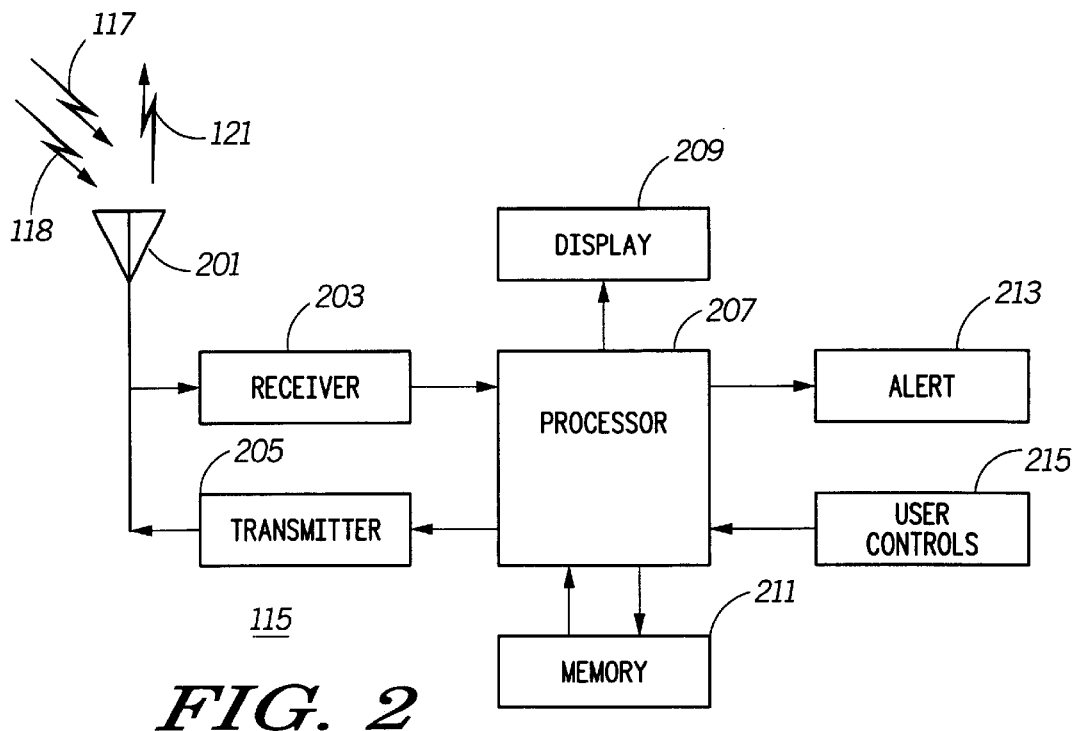
FIG. 2 illustrates a block diagram depiction of a communication unit in accordance with a preferred embodiment of the present invention.

FIG. 2 illustrates a communication unit (e.g., communication unit 115) in accordance with a preferred embodiment of the present invention. The preferred communication unit 115 includes an antenna 201, a receiver 203, a transmitter 205, a processor 207, a display 209, a memory 211, an alert 213, and user controls 215. All of these elements are well-known. For example, the receiver 203 includes filters, mixers, small-signal amplifiers, a demodulator, and other known elements necessary to produce an analog or digital baseband representation of the system infrastructure transmissions 117, 118. The transmitter 205 includes filters, mixers, a modulator, large-signal amplifiers, and other known elements to produce a radio frequency or microwave signal representation of information to be conveyed to the system infrastructure. The processor 207 preferably comprises a microprocessor or a digital signal processor that operates in accordance with stored software programs.

The display 209 preferably comprises a liquid crystal display or other similar display capable of producing, responsive to processor signaling, graphical displays or alpha-numeric displays. Alternatively, the display 209 may comprise a speaker or other device capable of producing an audible display responsive to signaling from the processor 207. The memory 211 preferably includes random access memory (RAM) for temporary storage of user-inputted information and various other forms of memory, such as read only memory (ROM), programmable ROM (PROM), and electronically-erasable PROM, for more permanent storage of software programs utilized by the processor 207. The alert 213 comprises a speaker for providing audible alerts or a vibrating mechanism, such as a miniature electric motor with a eccentric counterweight, for providing silent alerts responsive to signaling from the processor 207. The user controls 215 preferably comprise a keypad, although other controls, such as a mouse, a touch screen, a speech detector, or a push-to-talk button, could alternatively be used. The primary novelty of the present invention as it pertains to the communication unit 115 resides in a software algorithm stored in the memory 211 and executed by the processor 207.

Operation of the preferred communication unit 115 occurs substantially as follows in accordance with the present invention. The antenna 201 receives time incremental cost transmissions 117, 118 from one or more system infrastructures. For the remainder of this discussion of the preferred communication unit 115, it is assumed that a time incremental cost transmission 117 has been received from only one system infrastructure.

A radio frequency or microwave path (e.g., a cable) communicates the time incremental cost transmission 117 from the antenna 201 to the receiver 203. The receiver 203 downconverts, demodulates, and processes the transmission 117 to produce a bit stream indicative of the time incremental cost. The receiver 203 then provides the bit stream to the processor 207; Upon receiving the bit stream, the processor 207 preferably sends a control signal to the alert 213 to activate the alert 213 and, thereby, inform the user of the communication unit 115 that a time incremental cost transmission 117 has been received. The processor 207 also preferably sends appropriate signaling to the display 209 to instruct the display 209 to display the time incremental cost to the user. The order in which alerting and displaying are performed is not particularly important, and both may be performed contemporaneously or sequentially.

If the displayed time incremental cost is acceptable to the user, the user uses the user controls 215 (e.g., keypad or push-to-talk button) to instruct the processor 207 to generate a message at least indicating the user's desire to communicate in the wireless system. For example, responsive to the user's input of a telephone number and depressing of the "SEND" key on the user controls 215, the processor 207 creates a channel request message. The processor 207 then conveys the message to the transmitter 205 for formulation into a modulated radio frequency or microwave signal. The transmitter 205 provides its modulated output to the antenna 201 for radiated transmission of the message 121 to the system infrastructure during the time period when the time incremental cost is acceptable to the user.

In an alternative embodiment, prior to reception of an acceptable time incremental cost from the system infrastructure, the user might use the user controls 215 to input user information (e.g., a text message or a voice message) and a desired time incremental cost. Once input, the user information and desired time incremental cost are provided to the processor 207, which stores them in respective locations of the memory 211. If the user information includes a voice message, the processor 207 may first digitize the voice input and use known compression techniques to compress the voice information prior to storage.

In such an alternative embodiment, when a time incremental cost transmission 117 is eventually received from the system infrastructure, the processor 207 does not need to alert the user or display the received time incremental cost to the user, although it could if so desired by the user. Rather, the processor 207 first compares the received time incremental cost to the desired time incremental cost stored in the memory 211 and then, if the received time incremental cost is less than or equal to the stored desired time incremental cost, automatically generates the message (e.g., channel request) indicating the communication unit's desire to communicate. The processor also retrieves the stored user information, either to include as part of the message indicating the communication unit's desire to communicate or upon receipt of a channel grant from the system infrastructure, and provides it to the transmitter 205 for transmission to the system infrastructure during the time period when the time incremental cost is less than or equal to the desired time incremental cost.

In a further embodiment, the user might also store a maximum transmission delay indication (e.g., a time of day, such as 9:00 PM, or a time duration, such as one hour) in the memory 211 of the communication unit 115 at the same time, or some time after, the user stores the desired time incremental cost and/or user information. As noted above, the maximum transmission delay indication sets an upper time limit for the communication unit 115 to delay transmission of the user information while awaiting receipt of a time incremental cost that is less than or equal to the desired time incremental cost.

In this embodiment, the processor 207 includes a clock and periodically compares the time period associated with the stored maximum transmission delay indication to the elapsed time (e.g., when the maximum transmission delay indication is a time duration) or the time of day (e.g., when the maximum transmission delay indication is a time of day). If the time period associated with the maximum transmission delay indication expires before the processor 207 receives a time incremental cost that is less than or equal to the stored desired time incremental cost, the processor 207 either instructs the transmitter 205 to transmit the user information at the current time incremental cost or instructs the display 209 to display a query to the user requesting the user to either authorize or cancel transmission of the user information. Of course, if the processor 207 receives a time incremental cost that is less than or equal to the stored desired time incremental cost prior to expiration of the time period associated with the maximum transmission delay indication, the processor 207 instructs the transmitter 205 to transmit the user information during the time period associated with the more favorable time incremental cost.

As described above, the present invention provides for real-time transmission of tariff information to system users to enable the system users to be more selective in their decisions to use the system. In contrast to prior art systems in which tariff information is provided after the user initiates a communication to inform the user of the costs he or she is continually incurring, the present invention provides time incremental cost information to users on a regular basis prior to the user's initiating a communication. By having such information ahead of time, the user can decide whether his or her call or data communication is important enough to make at the present cost.

The present invention is also beneficial to system operators because it allows the operators to balance system loading by encouraging users to use the system during system load lulls and discouraging users from using the system during system load peaks. By balancing system load over time, system operators can design systems for average loads, thereby reducing infrastructure costs as compared with designing systems to handle peak loads.

Figure 3:
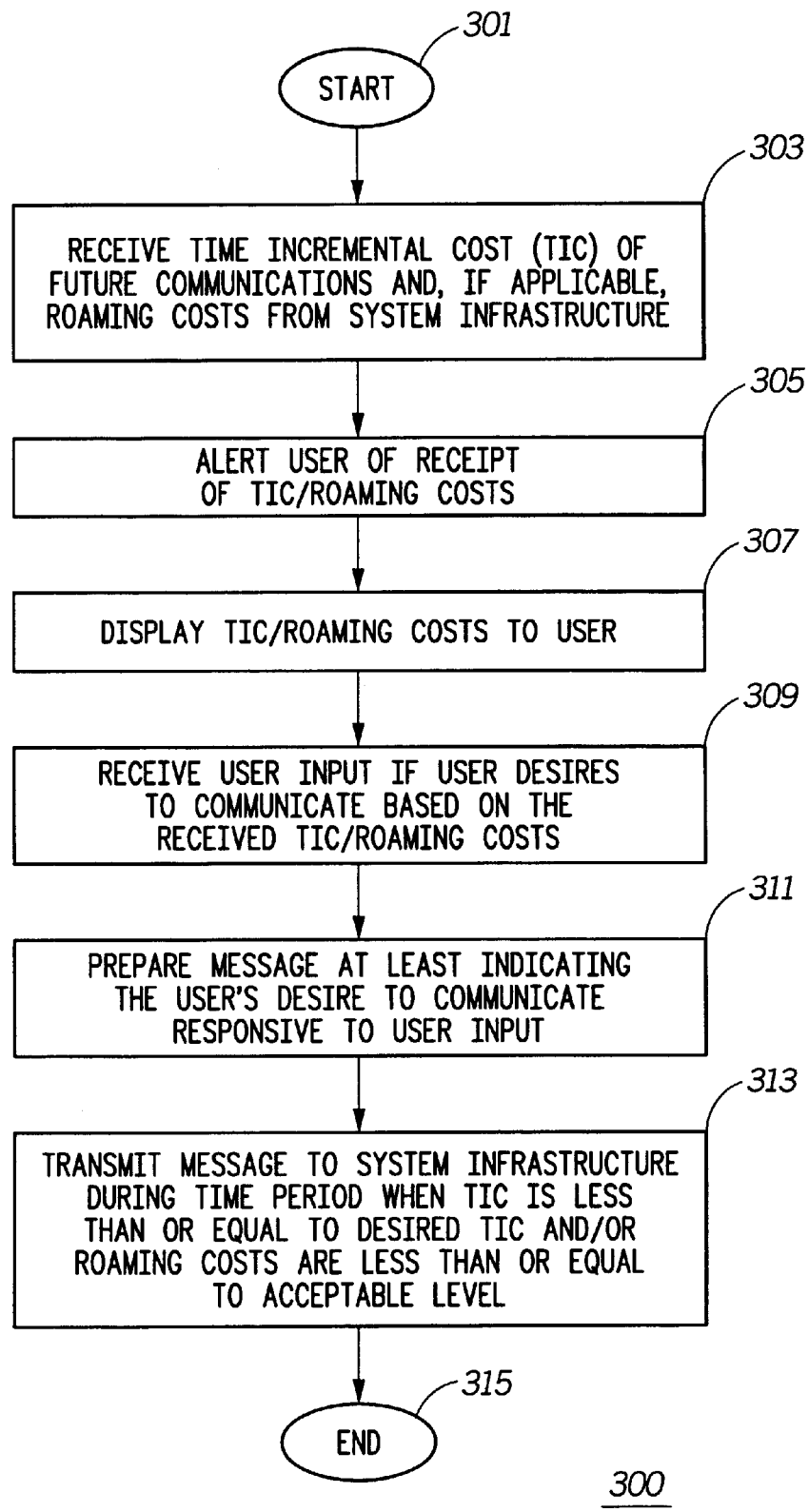
FIG. 3 illustrates a logic flow diagram of steps executed by a communication unit in accordance with a preferred embodiment of the present invention.

FIG. 3 illustrates a logic flow diagram 300 of steps executed by a communication unit in accordance with a preferred embodiment of the present invention. The logic flow begins (301) when the communication unit receives (303) a transmission from the system infrastructure indicating the time incremental cost of future communications and, if the communication unit is provisioned in a communication system other than the system currently serving the communication unit, roaming costs associated with communicating in the serving system. The transmission from the system infrastructure may have been broadcast to multiple communication units or may have been individually addressed to the communication unit. The time incremental cost of future communications is established on a temporary basis by the system infrastructure responsive to system operator input. Thus, the time incremental cost may vary from hour-to-hour, day-to-day, or week-to-week depending on various factors, such as actual system load, expected system load, communication unit location, level or quality of service associated with the communication unit, and/or a quantity of information to be transmitted or received by the communication unit or an expected duration of a communication involving the communication unit.

Subsequent to receiving the time incremental cost, the communication unit preferably alerts (305) the user of the communication unit of its receipt of the time incremental cost and, if applicable, roaming costs. The alert may be in any known form, such as activation of a vibration device, generation of an audible series of tones or beeps, or generation of a synthesized voice message.

In addition to alerting the user of the received cost information, the communication unit preferably displays (307) the time incremental cost and, if applicable, roaming costs to the user. The display may be in the form of a horizontal bar graph, such as is commonly used to indicate signal strength or battery charge in cellular phones, an alpha-numeric display, an audible voice-synthesized message, or the like.

Some time after alerting and/or displaying the received time incremental costs and, if applicable, roaming costs to the communication unit user, the communication unit receives (309) user input if the user desires to communicate based on the received cost information. That is, if the user determines that the displayed cost information is acceptable, then the user will initiate the communication by inputting appropriate information into the communication unit (e.g., dialing digits and pressing the "SEND" button or pressing appropriate function keys to recall a stored message and pressing the "SEND" or "TRANSMIT" button).

Responsive to receiving user input indicating a desire to communicate, the communication unit prepares (311) a message at least indicating the user's desire to communicate. The message may be a channel request message (e.g., in a cellular or two-way radio system) or may also include user data to be transmitted.

Once the message is prepared, the communication unit transmits (313) the message to the system infrastructure during the time period associated with the acceptable time incremental cost and/or roaming costs (e.g., during the period when the time incremental cost and roaming costs are less than or equal to respective acceptable levels), and the logic flow ends (315).

Figure 4:
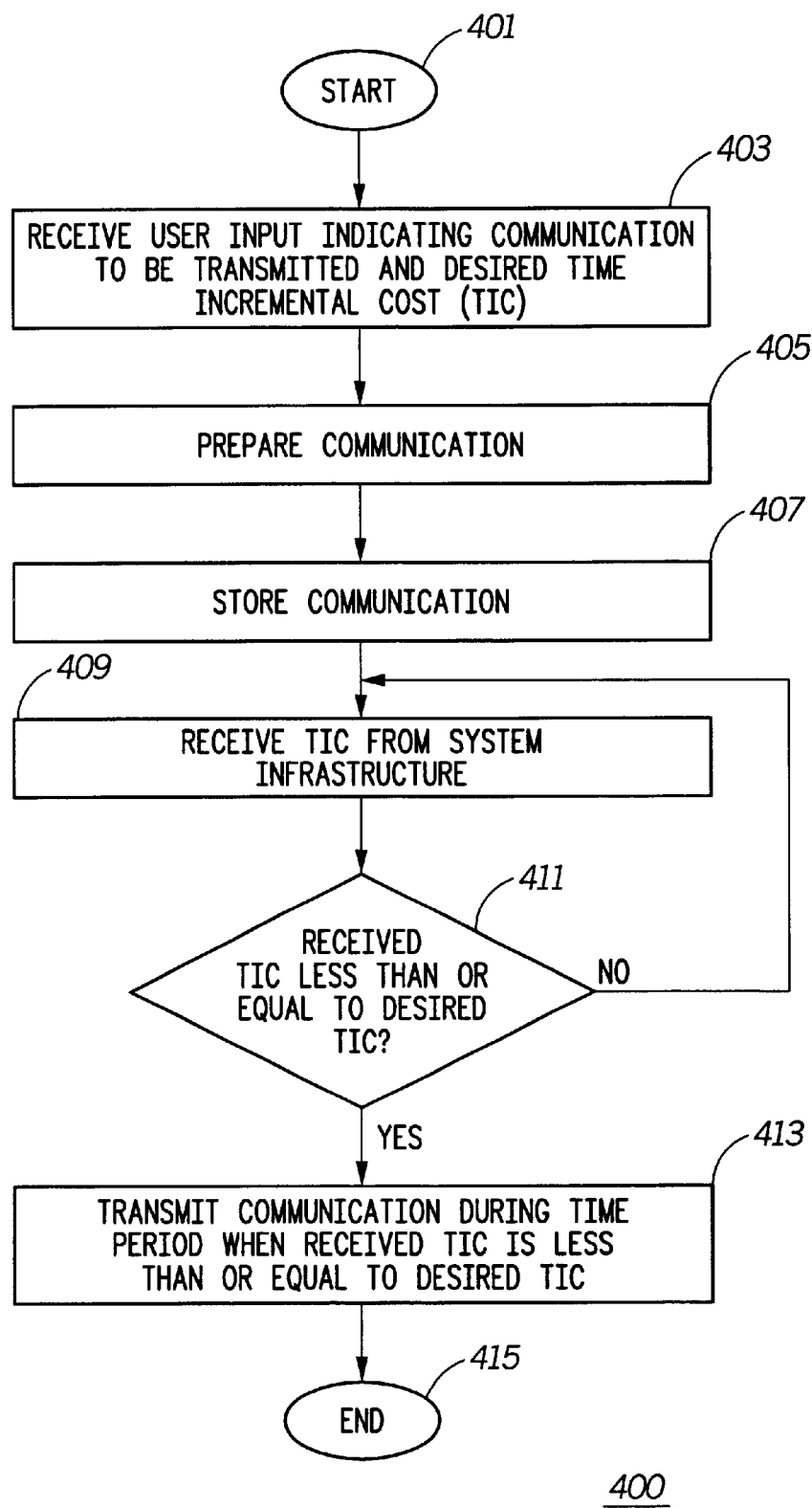
FIG. 4 illustrates a logic flow diagram of steps executed by a communication unit in accordance with an alternative embodiment of the present invention.

FIG. 4 illustrates a logic flow diagram 400 of steps executed by the communication unit in accordance with an alternative embodiment of the present invention. The logic flow begins (401) when the communication unit receives (403) user input (e.g., from a keypad or other input device) indicating a communication to be transmitted to the system infrastructure and a desired time incremental cost for the communication. For example, the communication unit might operate in a variety of user input modes, one of which prompts the user to input and store a text message, and prompts the user to input and store a desired time incremental cost and, if applicable, roaming costs. In this case, the desired time incremental cost is the maximum time incremental cost that is acceptable to the user.

Responsive to the user input, the communication unit prepares (405) the communication (e.g., by converting inputted ASCII characters or numbers into binary form) and stores (407) the communication in memory for later transmission. Some time after preparing and storing the communication, the communication unit receives (409) a time incremental cost transmission from the system infrastructure. The communication unit compares the received time incremental cost to the stored desired time incremental cost to determine (411) whether the received time incremental cost is less than or equal to the desired time incremental cost.

If the received time incremental cost is less than or equal to the desired time incremental cost, the communication unit transmits (413) the stored communication (e.g., data message or telephone number) during the time period when the received time incremental cost is less than or equal to the desired time incremental cost, and the logic flow ends (415). Alternatively, the communication unit might notify the user upon receipt of a time incremental cost that is less than or equal to the desired time incremental cost and await receipt of user input responsive to the notification before transmitting the stored or a new communication.

If, however, the received time incremental cost is greater than the desired time incremental cost, the communication unit delays transmission of the communication and awaits the next time incremental cost transmission. If roaming costs are applicable, a similar analysis is performed by the communication unit to compare the received roaming costs to the desired roaming costs, and to transmit when the roaming costs are less than or equal to the desired roaming costs.

Figure 5:
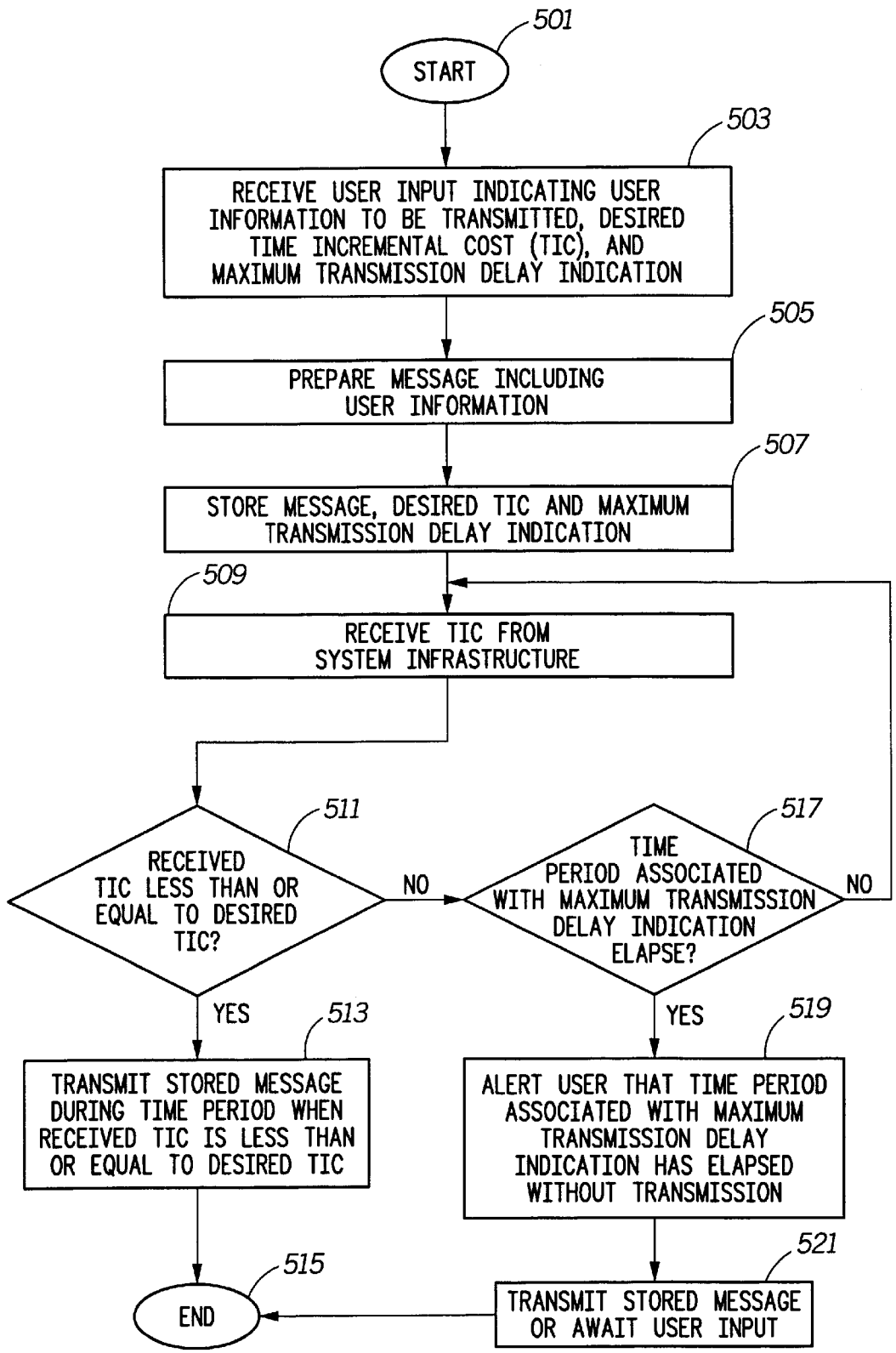
FIG. 5 illustrates a logic flow diagram of steps executed by a communication unit in accordance with another alternative embodiment of the present invention.

FIG. 5 illustrates a logic flow diagram 500 of steps executed by the communication unit in accordance with another alternative embodiment of the present invention. The logic flow begins (501) when the communication unit receives (503) user input indicating not only user information to be transmitted to the system infrastructure and a desired time incremental cost as in block 403 of FIG. 4, but also a maximum transmission delay indication. The maximum transmission delay indication defines the maximum allowable delay acceptable to the user for transmission of the user information. The maximum transmission delay indication preferably comprises a duration of time (e.g., one hour) or a time of day (e.g., 3:00 PM).

Responsive to the user input, the communication unit prepares (505) the message, wherein, in this embodiment, the message includes the user information, and stores (507) the message, the desired time incremental cost, and the maximum transmission delay indication in a memory of the communication unit. Some time after storing the message, the desired time incremental cost, and the maximum transmission delay indication, the communication unit receives (509) a time incremental cost transmission from the system infrastructure. The communication unit compares the received time incremental cost to the stored desired time incremental cost to determine (511) whether the received time incremental cost is less than or equal to the desired time incremental cost.

If the received time incremental cost is less than or equal to the desired time incremental cost, the communication unit transmits (513) the stored communication during the time period when the received time incremental cost is less than or equal to the desired time incremental cost, and the logic flow ends (515). Alternatively, the communication unit might notify the user upon receipt of a time incremental cost that is less than or equal to the desired time incremental cost and await receipt of user input responsive to the notification before transmitting the stored or a new communication.

If, however, the received time incremental cost is greater than the desired time incremental cost, the communication unit determines (517) whether the time period associated with the maximum transmission delay indication has elapsed. If such time period has not elapsed, the communication unit continues to receive time incremental costs as they are transmitted from the system infrastructure, and the logic flow continues at block 509.

However, if the time period associated with the maximum transmission delay indication has elapsed prior to commencement of the time period when the received time incremental cost is less than or equal to the desired time incremental cost, the communication unit preferably alerts (519) the user that such period has elapsed without transmission of the message and automatically transmits (521) the message or awaits user input responsive to the alert, thereby ending (515) the logic flow. Therefore, in this embodiment, as long as the time period when the time incremental cost is less than or equal to the desired time incremental cost at least begins during a time period associated with the maximum transmission delay indication, the communication unit transmits (513) the stored message at the desired cost or less. By contrast, if the time period associated with the maximum transmission delay indication elapses prior to receipt of a favorable time incremental cost, the communication unit alerts (519) the user and either transmits (521) the stored message at the higher cost or awaits user input.

Figure 6:
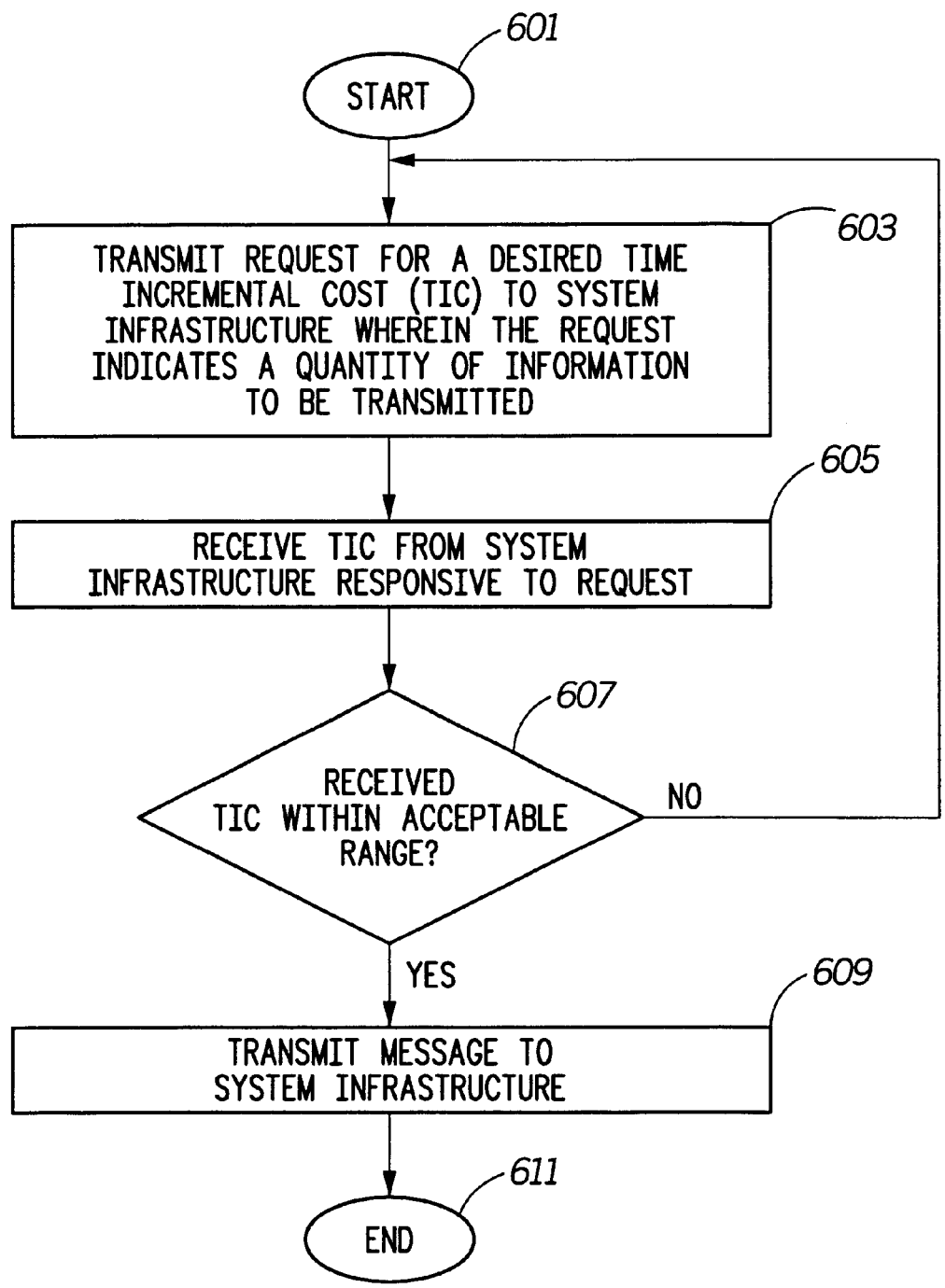
FIG. 6 illustrates a logic flow diagram of steps executed by a communication unit in accordance with yet another alternative embodiment of the present invention.

FIG. 6 illustrates a logic flow diagram 600 of steps executed by the communication unit in accordance with yet another alternative embodiment of the present invention. The logic flow begins (601) when the communication unit transmits (603) a request to the system infrastructure for a desired time incremental cost, wherein the request indicates a quantity of information to be transmitted by the communication unit (or alternatively an expected call duration). Some time after transmission of the request, the communication unit receives (605) a time incremental cost from the system infrastructure responsive to the request. In this case, the received time incremental cost is the time incremental cost established by the system infrastructure based on the quantity of information to be transmitted by the communication unit (or alternatively the expected call duration).

Upon receiving the time incremental cost from the system infrastructure, the communication unit determines (607) whether the received time incremental cost is within an acceptable range. For example, the communication unit might compare the received time incremental cost to a previously stored cost range to determine if the received cost is within the range. Alternatively, the communication unit might display the received time incremental cost to the user and await the user's input indicating acceptability.

If the communication unit determines that the received time incremental cost is acceptable, the communication unit transmits (609) a message to the system infrastructure during the time period associated with the acceptable time incremental cost, and the logic flow ends (611). As discussed above, the message may be a channel request or may also include user data depending on the particular wireless communication system. On the other hand, if the communication unit determines that the received time incremental cost is not acceptable, the communication unit might transmit a request indicating another proposed time incremental cost (i.e., make another time incremental cost offer), as depicted in FIG. 6, or await receipt of another time incremental cost transmission from the system infrastructure.

The methodology described above with respect to FIG. 6 enables the communication unit, or the user thereof, to negotiate communication tariffs on a real-time basis, as opposed to requiring a system user to enter into a service agreement for a lower tariff based on an expected system usage. The prior art approach requires the system user to guess at the amount of his or her expected system usage and enter into a plan that might provide for a lower tariff based on the expected usage. If the user indeed uses the system as much as expected, then the user has attained his or her cost objective. However, if the user does not use the system as much as expected, the user might actually pay a much higher tariff. In contrast, the present invention allows the tariff negotiation to occur on a communication-by-communication basis in an attempt to insure a fair tariff for each communication.

Figure 7:
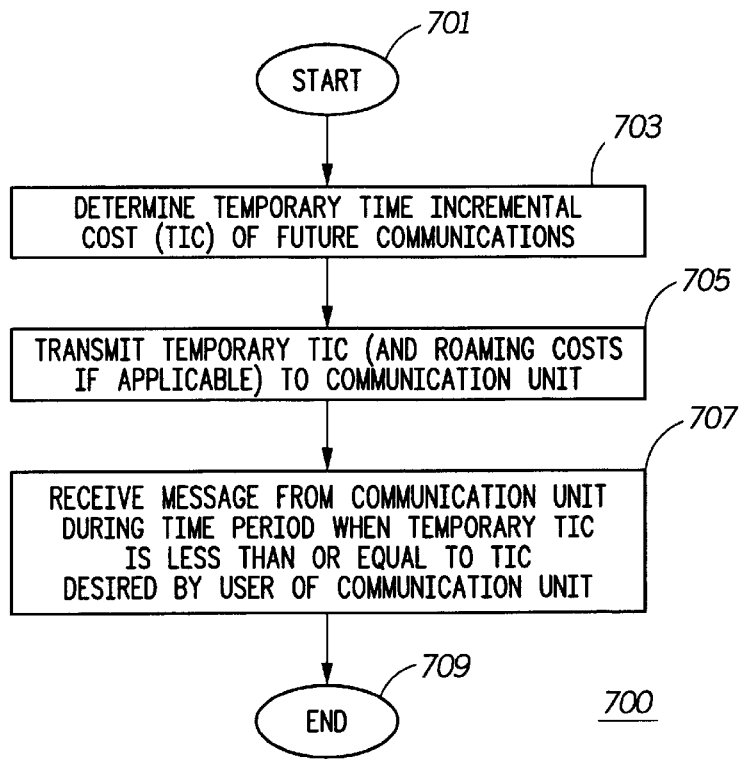
FIG. 7 illustrates a logic flow diagram of steps executed by a system infrastructure in accordance with the present invention.

FIG. 7 illustrates a logic flow diagram 700 of steps executed by the system infrastructure in accordance with the present invention. The logic flow begins (701) when the system infrastructure determines (703) a temporary time incremental cost of future communications. This determination may be based on a variety of factors, such as actual system load, expected system load, communication unit location, level or quality of service associated with the communication unit, and/or a quantity of information to be transmitted by a communication unit or an expected duration of a communication involving a communication unit. The time incremental cost is temporary because it may be determined at various times based on changes in one or more of the aforementioned factors.

After determining the time incremental cost, the system infrastructure transmits (705) the time incremental cost (and possibly roaming costs, if applicable) to one or more communication units. The time incremental cost transmission may be broadcast to multiple communication units or may be individually addressed to one or more particular units.

Some time after transmitting a temporary time incremental cost, the system infrastructure receives (707) a message from a communication unit during the time period when the temporary time incremental cost is less than or equal to a time incremental cost desired by a user of the communication unit. The message, as discussed above, may be a simple channel request or may also include user information. Upon receiving the message, the system infrastructure processes the message in accordance with known techniques and the logic flow ends (709).

The present invention encompasses a method and apparatus for communicating in a wireless communication system. With this invention, system users are privy to time incremental costs as they are varied from time-to-time by the system operator. Therefore, system users can perform real-time cost-benefit analyses prior to initiating voice or data communications to determine whether initiating such a communication at the current time incremental cost is worthwhile. In addition, in one embodiment of the present invention, a system user can attempt to negotiate tariffs with the system infrastructure on a communication-by-communication basis, particularly when the user expects to use substantial system resources, in contrast to guessing at the amount of monthly system usage when originally signing up for system service.

The present invention is also beneficial to system operators because it allows system operators to adjust system load in real time by varying time incremental costs of upcoming communications. That is, by raising or lowering tariffs, the system operators can decrease or increase, respectively, the amount of traffic in the system or at particular base sites in the system. By using the present invention, the system operators can obtain real-time system load adjustments, in sharp contrast to awaiting results of advanced promotional tariffs distributed by print mail or voice mail.

While the foregoing constitute certain preferred and alternative embodiments of the present invention, it is to be understood that the invention is not limited thereto and that in light of the present disclosure, various other embodiments will be apparent to persons skilled in the art. Accordingly, it is to be recognized that changes can be made without departing from the scope of the invention as particularly pointed out and distinctly claimed in the appended claims which shall be construed to encompass all legal equivalents thereof.

What is claimed is:

1. A method for a wireless communication unit to initiate a communication at an acceptable cost in a wireless communication system that includes a system infrastructure, the method comprising the steps of:

preparing a message for transmission;

storing the message to produce a stored message;

receiving, from the system infrastructure, a transmission that indicates a time incremental cost of future communications, the time incremental cost being temporarily established by the system infrastructure; and responsive to the step of receiving, automatically delaying transmission of the stored message for a particular time period corresponding to an undesired time incremental cost and transmitting the stored message to the system infrastructure during a time period when the time incremental cost is less than or equal to a desired time incremental cost according to the time incremental cost of future communications.

2. The method of claim 1, further comprising the step of:

prior to the step of transmitting the stored message, displaying the time incremental cost to a user of the communication unit.

3. The method of claim 1, further comprising the step of:

transmitting, by the system infrastructure, the time incremental cost to the communication unit in a control message individually addressed to the communication unit.

4. The method of claim 3, further comprising the steps of:

determining, by the system infrastructure, the time incremental cost based on a level of service associated with the communication unit.

5. The method of claim 1, further comprising the steps of:

determining, by the system infrastructure, the time incremental cost based on a location of the communication unit.

6. The method of claim 1, further comprising the step of:

determining, by the system infrastructure, a load of the wireless communication system;

during a time period when the load is greater than or equal to a load threshold, transmitting a first time incremental cost to the communication unit; and during a time period when the load is less than the load threshold, transmitting a second time incremental cost to the communication unit, wherein the second time incremental cost is less than the first time incremental cost.

7. The method of claim 1, further comprising the step of:

responsive to receiving the time incremental cost, alerting a user of the communication unit that the time incremental cost has been received.

8. The method of claim 1, wherein the communication unit is provisioned in a wireless communication system other than said wireless communication system and wherein the step of receiving further comprises the step of:

receiving roaming costs associated with future communications in said wireless communication system.

9. The method of claim 8, wherein the step of transmitting further comprises the step of:

transmitting the stored message during a time period when the roaming costs are less than or equal to a desired level of roaming costs.

10. The method of claim 1, further comprising the steps of:

prior to receiving the time incremental cost, storing a maximum transmission delay indication; and wherein the step of transmitting further comprises the step of:

transmitting the stored message during the time period when the time incremental cost is less than or equal to the desired time incremental cost when the desired time incremental cost at least begins during a time period associated with the maximum transmission delay indication.

11. The method of claim 10, further comprising the step of:

alerting a user of the communication unit in the event that the time period associated with the maximum transmission delay indication has ended without transmission of the stored message.

12. The method of claim 10 wherein the step of transmitting further comprises the step of:

transmitting the stored message during a time period when the time incremental cost is greater than the desired time incremental cost in the event that the time period associated with the maximum transmission delay indication ends prior to commencement of the time period when the time incremental cost is less than or equal to the desired time incremental cost.

13. The method of claim 10, wherein the maximum transmission delay indication comprises a time of day or a time duration.

14. The method of claim 1, further comprising the step of:

prior to receiving the time incremental cost from the system infrastructure, transmitting, to the system infrastructure, a request for the desired time incremental cost, the request indicating a quantity of information to be transmitted by the communication unit.

15. A wireless communication unit for use in a wireless communication system that includes a system infrastructure, the wireless communication unit comprising:

a user interface enabling a user to prepare and store a message for transmission in a memory;

a receiver for receiving transmissions from the system infrastructure indicating time incremental costs of future communications, the time incremental costs being temporarily established by the system infrastructure;

a processor, coupled to the receiver, for comparing the time incremental costs to a desired time incremental cost; and a transmitter, responsive to the processor, for transmitting the stored message to the system infrastructure during a time period when time incremental cost is less than or equal to the desired time incremental cost.

16. The communication unit of claim 15, further comprising:

a display, coupled to the processor, for displaying the time incremental costs to the user of the communication unit.

17. The communication unit of claim 16, wherein the display comprises at least one of a graphical display, an alpha-numeric display, and an audible display.

* * * * *